United States Patent
Kojima et al.

(10) Patent No.: US 9,315,390 B2
(45) Date of Patent: Apr. 19, 2016

(54) PRODUCTION PROCESS FOR LITHIUM-SILICATE-BASED COMPOUND

(75) Inventors: Toshikatsu Kojima, Ikeda (JP); Takuhiro Miyuki, Ikeda (JP); Tetsuo Sakai, Ikeda (JP); Akira Kojima, Kariya (JP); Junichi Niwa, Kariya (JP); Hitotoshi Murase, Kariya (JP); Kazuhito Kawasumi, Kariya (JP)

(73) Assignees: KABUSHIKI KAISHA TOYOTA JIDOSHOKKI, Aichi (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 71 days.

(21) Appl. No.: 13/701,746

(22) PCT Filed: Jun. 17, 2011

(86) PCT No.: PCT/JP2011/003488
§ 371 (c)(1),
(2), (4) Date: Dec. 3, 2012

(87) PCT Pub. No.: WO2012/001904
PCT Pub. Date: Jan. 5, 2012

(65) Prior Publication Data
US 2013/0078519 A1   Mar. 28, 2013

(30) Foreign Application Priority Data
Jun. 28, 2010   (JP) ................................. 2010-146577

(51) Int. Cl.
C01B 33/32 (2006.01)
H01M 4/1395 (2010.01)
H01M 4/131 (2010.01)
H01M 4/58 (2010.01)
H01M 10/052 (2010.01)

(52) U.S. Cl.
CPC ............... *C01B 33/32* (2013.01); *H01M 4/131* (2013.01); *H01M 4/1395* (2013.01); *H01M 4/5825* (2013.01); *H01M 10/052* (2013.01)

(58) Field of Classification Search
None
See application file for complete search history.

(56) References Cited

U.S. PATENT DOCUMENTS

| 2004/0086445 A1 | 5/2004 | Armand et al. |
| 2010/0140540 A1 | 6/2010 | Yamada et al. |
| 2011/0291055 A1 | 12/2011 | Kojima et al. |

FOREIGN PATENT DOCUMENTS

| CN | 101339992 A | | 1/2009 |
| JP | 2001-192210 | * | 7/2001 |
| JP | 2001-192210 A | | 7/2001 |
| JP | 2001-266882 A | | 9/2001 |
| JP | 2007-335325 A | | 12/2007 |
| JP | 2008-218303 A | | 9/2008 |
| JP | 2008-293661 A | | 12/2008 |
| WO | 2010/089931 A1 | | 8/2010 |

OTHER PUBLICATIONS

Translation of Azuma et al, JP 2001-192210, Jul. 2001.*
Translation of Kojima et al (Synthesis of Li2MSiO4 (M=Fe and Mn) in Molten Carbonate), Nov. 30, 2009, p. 114.*
Toshikatsu Kojima, et al., "Synthesis of Li2MSiO4 (M=Fe and Mn) in Molten Carbonate", The 50th Battery Symposium in Japan Abstracts, Nov. 30, 2009, p. 114.
Wengang Liu, et al., "Synthesis, characterization and electrochemical performance of Li2MnSiO4/C cathode material by solid-state reaction," Journal of Alloys and Compounds, 2009, pp. L1-L4, vol. 480, Issue 2.
Toshikatsu Kojima, et al., "Synthesis of Cathode Materials for Lithium Ion Batteries using Molten Salts", The 51st Battery Symposium in Japan Abstracts, Nov. 8, 2010, p. 192.
Office Action of JP 2010-146577 dated Jul. 10, 2012.
Office Action for corresponding Taiwanese Patent Application No. 100122373 issued on Jul. 11, 2013.

* cited by examiner

*Primary Examiner* — Tanisha Diggs
(74) *Attorney, Agent, or Firm* — Sughrue Mion, PLLC

(57) ABSTRACT

A production process for lithium-silicate-based compound according to the present invention is characterized in that: a lithium-silicate compound being expressed by Li2SiO3 is reacted with a transition-metal-element-containing substance including at least one member being selected from the group consisting of iron and manganese at 550° C. or less within a molten salt including at least one member being selected from the group consisting of alkali-metal nitrates as well as alkali-metal hydroxides in an atmosphere in the presence of a mixed gas including carbon dioxide and a reducing gas. In accordance with the present invention, it is possible to produce lithium-silicate-based materials, which are useful as a positive-electrode active material for lithium-ion secondary battery, and the like, at low temperatures by means of relatively easy means.

5 Claims, 1 Drawing Sheet

PRODUCTION PROCESS FOR LITHIUM-SILICATE-BASED COMPOUND

CROSS REFERENCE TO RELATED APPLICATIONS

This application is a National Stage International Application No. PCT/JP2011/003488,filed on Jun. 17, 2011, which claims priority from Japanese Patent Application No. 2010-146577, filed on Jun. 28, 2010, the contents of all of which are incorporated herein by reference in their entirety.

TECHNICAL FIELD

The present invention relates to a production process for lithium-silicate-based compound, which is useful as a positive-electrode active material of lithium-ion secondary battery, for instance, and to uses or applications for the lithium-silicate-based compound that is obtainable by this process.

BACKGROUND ART

Lithium secondary batteries have been used widely as power sources for portable electronic instruments, because they are small-sized and have high energy densities. As for their positive-electrode active materials, lamellar compounds, such as $LiCoO_2$, have been employed mainly. However, these compounds have such a problematic issue that the oxygen is likely to be eliminated at around 150° C. under the fully-charged conditions so that this is likely to cause the oxidative exothermic reactions of nonaqueous electrolyte liquids.

Recently, as for positive-electrode active material, olivine-type phosphate compounds, Li"M"$PO_4$ (e.g., $LiMnPO_4$, $LiFePO_4$, $LiCoPO_4$, and the like), have been proposed. These compounds upgrade the thermal stabilities by means of using the divalent/trivalent oxidation-reduction reaction, instead of the trivalent/tetravalent oxidation-reduction in which an oxide like $LiCoO_2$ serves as a positive-electrode active material; and have been attracting attention as compounds from which higher discharging voltages are available by means of further arranging the polyanions of hetero elements whose electronegativities are higher around the central metal.

However, in a positive-electrode material comprising an olivine-type phosphate compound, its theoretical capacity is limited to 170 mAh/g approximately because of the large molecular weight of phosphate polyanions. In addition, $LiCoPO_4$ and $LiNiPO_4$ have such a problem that no electrolytic liquids, which can withstand their charging voltages, are available because the operating voltages are too high.

Hence, as a cathode material that is inexpensive, which is more abundant in the amount of resource, which is lower in the environmental load, which has a higher theoretical charging/discharging capacity of lithium ion, and which does not release any oxygen at the time of high temperature, lithium-silicate-based materials, such as $Li_2FeSiO_4$ (with 331.3-mAh/g theoretical capacity) and $Li_2MnSiO_4$ (with 333.2-mAh/g theoretical capacity), have been attracting attention. These silicate-based materials are expected as a positive-electrode material for lithium secondary battery with much higher capacity, respectively. In addition, their discharging voltages are lower than those of phosphate-based ones by about 0.6V approximately, which is a reflection of the fact that the electronegativity of Si, a hetero element, is smaller than that of P. Thus, there is such a possibility that Co and Ni are employable as a doping element to the silicates.

Of these silicate materials, $Li_2FeSiO_4$ is a material showing the highest charging/discharging characteristic ever that has been reported at present, and exhibits a capacity of 160 mAh/g approximately. However, $Li_2FeSiO_4$ has not yet arrived at obtaining a charging/discharging characteristic that goes beyond 169.9 mAh/g, the theoretical capacity of $LiFePO_4$ that is one of the current materials.

As for synthesizing methods for the silicate-based compounds being mentioned above, the hydrothermal synthesis method, and the solid-phase reaction method have been known.

Of these methods, it is feasible to obtain fine particles with particle diameters of from 1 to 10 nm approximately by means of the hydrothermal synthesis method. However, in silicate-based compounds being obtained by means of the hydrothermal synthesis method, there are the following problems: doping elements are less likely to dissolve; the phases of impurities are likely to be present mixedly; and additionally battery characteristics being expressed are not quite satisfactory.

On the other hand, in the solid-phase reaction method, although it is feasible to dissolve doping elements because it is needed to cause reactions at such high temperatures as 650° C. or more for a long period of time, the resulting crystal grains become larger to 10 μm or more, thereby leading to such a problem that the diffusion of ions is slow. Besides, since the reactions are caused at the high temperatures, the doping elements, which have not dissolved completely, precipitate to generate impurities in the cooling process, and so there is also such a problem that the resultant resistance becomes higher. In addition, since lithium-deficient or oxygen-deficient silicate-based compounds have been made due to the heating being done up to the high temperatures, there is also such a problem that it is difficult to increase capacities or to upgrade cyclabilities (refer to following Patent Literature Nos. 1 through 4).

RELATED TECHNICAL LITERATURE

Patent Literature

Patent Literature No. 1: Japanese Unexamined Patent Publication (KOKAI) Gazette No. 2008-218303;
Patent Literature No. 2: Japanese Unexamined Patent Publication (KOKAI) Gazette No. 2007-335325;
Patent Literature No. 3: Japanese Unexamined Patent Publication (KOKAI) Gazette No. 2001-266882; and
Patent Literature No. 4: Japanese Unexamined Patent Publication (KOKAI) Gazette No. 2008-293661

SUMMARY OF THE INVENTION

Assignment to be Solved by the Invention

In view of such circumstances, the present inventors found out a process that can produce by means of relatively easy means materials, which have excellent performance, namely, which have improved cyclabilities, capacities, and the like, for lithium-silicate-based compounds, which are useful for a positive-electrode material, and so forth, for lithium-ion secondary battery.

To be concrete, lithium-silicate-based compounds including iron and/or manganese were obtained under relatively mild conditions by reacting $Li_2SiO_3$ with a substance including a transition metal element, which included at least one member being selected from the group consisting of iron and manganese, within a mixture molten salt between lithium carbonate and the other alkali-metal carbonate in an atmosphere in the presence of a mixed gas of a reducing gas and carbon dioxide. And, the following were understood: the thus obtained lithium-silicate-based compounds turn into silicate-based compounds that are fine, which have less impurity phases, and which include lithium atoms excessively; and they turn into materials whose cyclabilities are satisfactory, and which have high capacities in a case where they are used as a positive-electrode active material for lithium-ion secondary battery. It has been known that the finer active materials' particles are the more satisfactory battery characteristics they show. Moreover, it has been deemed that carrying out syntheses under milder conditions in which the temperature is lower is more likely to result in obtaining active materials with finer particles. However, in the above-mentioned production process where a mixture molten salt between lithium carbonate and the other alkali-metal carbonate is used, it has been difficult to retard impurities from generating when syntheses are carried out at temperatures that are lower than the melting points of carbonates to be used.

Hence, the present inventors investigated production processes that made it feasible to synthesize compounds, which are equivalent to the lithium-silicate-based compounds being obtainable by means of the above-mentioned production process, under much milder conditions.

Specifically, in view of the aforementioned problematic issues, the present invention aims at providing a novel production process that makes it possible to produce lithium-silicate-based materials, which are useful as a positive-electrode material, and the like, for lithium-ion secondary battery, at lower temperatures by means of relatively easy means.

Means for Solving the Assignment

As a result of the present inventors' earnest studies and repeated trials and errors, they found out anew that, even under conditions that are much milder than are the above-mentioned production conditions, it is possible to obtain lithium-silicate-based compounds including iron and/or manganese. On this occasion, it was understood anew that compounds, which are equivalent to those lithium-silicate-based compounds being obtainable by the above-mentioned production process, are obtainable simply and easily by employing specific molten salts, which are capable of turning into molten salts at low temperatures, instead of employing the mixture comprising carbonate.

Specifically, a production process for lithium-silicate-based compound according to the present invention is characterized in that:

a lithium-silicate compound being expressed by $Li_2SiO_3$ is reacted with a transition-metal-element-containing substance including at least one member being selected from the group consisting of iron and manganese at 550° C. or less within a molten salt including at least one member being selected from the group consisting of alkali-metal nitrates as well as alkali-metal hydroxides in an atmosphere in the presence of a mixed gas including carbon dioxide and a reducing gas.

In the production process for lithium-silicate-based compound according to the present invention, syntheses at relatively low temperatures become feasible by employing the above-mentioned molten salt of nitrate and/or hydroxide. As a result of researches by the present inventors, it is believed to be important that oxide ions (i.e., $O^{2-}$) exist as one of the dissolved species in molten salts, along with Li, Si, Fe and/or Mn, and the like, in order to obtain lithium-silicate-based compounds by reacting the above-mentioned lithium-silicate compound with the above-mentioned transition-metal-element-containing substance. However, it is not necessary the case that desirable lithium-silicate-based compounds are surely obtainable when compounds including oxide are employed as a molten salt. In a case where syntheses at relatively low temperatures are presupposed, it was understood that the molten salt of sulfate and the molten salt of phosphate, for instance, are less likely to release $O^{2-}$ into the resulting molten salts so that it is difficult to synthesize lithium-silicate-based compounds. That is, the molten salt including nitrate and/or hydroxide, whose melting point is low and which releases $O^{2-}$ even at 550° C. or less, is optimum for syntheses for lithium-silicate-based compounds that are carried out at relatively low temperatures.

Effect of the Invention

Lithium-silicate-based compounds, which are obtainable by means of the production process according to the present invention, are those which are obtainable using materials that are less expensive, whose resource amounts are great, and which exert loads less to environments. Moreover, the obtainable lithium-silicate-based compounds are materials that can inhibit the elimination of oxygen in the case of using them as a positive-electrode active material for lithium-ion secondary battery.

In particular, in accordance with the production process according to the present invention, it is possible to obtain lithium-silicate-based compounds, which show excellent battery characteristics in the case of being used as a positive-electrode active material, under mild conditions within molten salts with relatively low temperatures.

Moreover, the lithium-silicate-based compounds being mentioned above make a positive-electrode active material, respectively, in which the lithium-silicate-based compounds' crystal structure has changed to be stabilized and hence which have stable charging/discharging capacities, by means of using them as a positive-electrode active material for lithium-ion secondary battery and then carrying out charging and discharging.

MODES FOR CARRYING OUT THE INVENTION

Figure 1:
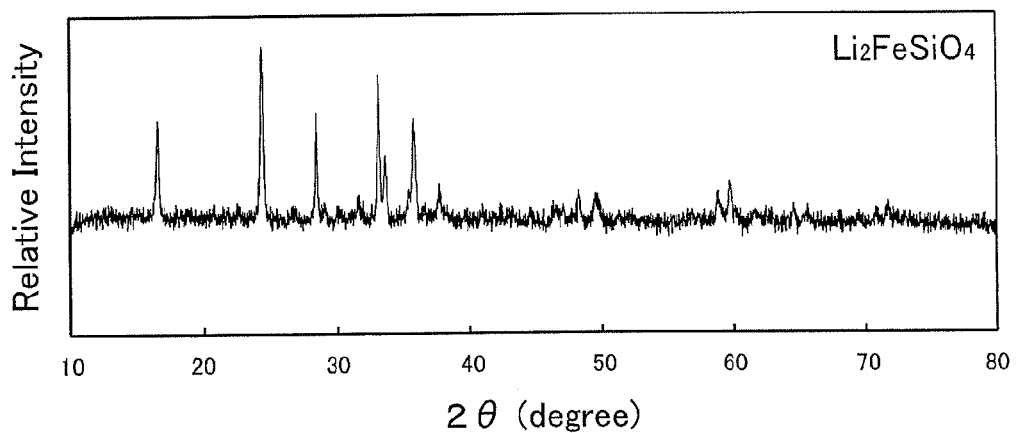
FIG. 1 illustrates an X-ray diffraction pattern of a compound that was synthesized by means of a process according to Example No. 1.

The present invention will be hereinafter explained in more detail while giving some of embodiment modes according to the present invention. Note that, unless otherwise specified, ranges, namely, "from 'p' to 'q'" being referred to in the present description, involve the lower limit, "p," and the upper limit, "q." Moreover, the other ranges, such as "from 'r' to 's'," are composable by arbitrarily combining any two of lower limits and upper limits being set forth in the present description. In addition, it is possible to make numeric values, which are selected arbitrarily from within the ranges of numeric values, into other upper and lower limit values.

Composition of Molten Salt

In a production process for lithium-silicate-based compound according to the present invention, it is necessary to carry out a synthesis reaction of lithium-silicate-based compound within a molten salt that includes at least one member being selected from the group consisting of alkali-metal nitrates as well as alkali-metal hydroxides. Since the molten temperature (or melting point) of these nitrates and hydroxides is 450° C. (e.g., that of lithium hydroxide) at the highest, it is possible to materialize low reaction temperatures even with a molten salt that includes either one member of the nitrates or hydroxides independently. However, in the case of making a mixed molten salt in which two or more members of them are mixed, it is possible to further decline the resulting molten salt's temperature and eventually the resultant reaction temperature because the resulting melting point lowers. For example, it becomes feasible to synthesize targeted lithium-silicate-based compounds at such relatively low reaction temperatures as from 150 to 550° C. As a result, the granular growth of lithium silicate is suppressed at the time of the synthesis reaction so that fine lithium-silicate-based compounds are formed. Moreover, in the case of causing reactions under the conditions being mentioned above within such a molten salt, the formation of impurity phases is less. In particular, lithium-silicate-based compounds including lithium atoms excessively are formed by means of using a molten salt that includes lithium nitrate and/or lithium hydroxide as an essential element. Lithium-silicate-based compounds being obtainable in this way make a positive-electrode material for lithium-ion battery that has favorable cyclability and high capacity, respectively.

To be concrete, the alkali-metal nitrates as well as the alkali-metal hydroxides can be the following: lithium nitrate ($LiNO_3$), potassium nitrate ($KNO_3$), sodium nitrate ($NaNO_3$), rubidium nitrate ($RbNO_3$), and cesium nitrate ($CsNO_3$); as well as lithium hydroxide (LiOH), potassium hydroxide (KOH), sodium hydroxide (NaOH), rubidium hydroxide (RbOH), and cesium hydroxide (CsOH). In addition, it is even advisable to further include at least one member of alkali-metal carbonates being selected from the group consisting of lithium carbonate ($Li_2CO_3$), potassium carbonate ($K_2CO_3$), sodium carbonate ($Na_2CO_3$), rubidium carbonate ($Rb_2CO_3$), and cesium carbonate ($Cs_2CO_3$), if needed.

It is allowable that the molten salt can be selected from the above-mentioned alkali-metal compounds so that the resulting molten temperature becomes 550° C. or less. When the alkaline-metal compounds are mixed to use, it is permissible to obtain a mixed molten salt by adjusting the mixing ratio so as to make the resultant mixture's molten temperature 550° C. or less. Since the mixing ratio differs depending on the types of salts, it is difficult to prescribe it in general. For example, it is preferable that a mixing ratio between lithium nitrate and at least one member of alkali-metal nitrates, which is selected from the group consisting of potassium nitrate, sodium nitrate, rubidium nitrate and cesium nitrate, can be from 30 to 100% by mol for the lithium nitrate, or furthermore from 40 to 70% by mol therefor, when the entirety of the resulting nitrate mixture is taken as 100% by mol.

As an example, a molten salt of a nitrate mixture between lithium nitrate and potassium nitrate can be given. A desirable mixing ratio, namely, (Lithium Nitrate):(Potassium Nitrate), can be from 30:70 to 70:30, or furthermore from 36:64 to 46:54, by molar ratio.

Moreover, in the case of employing a molten salt that further includes a carbonate along with a nitrate and/or hydroxide, it is advisable to mix the nitrate and/or hydroxide with the carbonate in order to use in such a rate as from 1:0.5 to 1:1.2, or furthermore from 1:0.8 to 1:1, by mass ratio. Including a carbonate leads to declining the melting point of the resulting molten salt, thereby making syntheses at low temperatures simple and easy. Although it is less likely to obtain the advantageous effect of declining the molten temperature if the carbonate proportion is too less, the carbonate proportion being too much is not desirable because $O^{2-}$ being released from a nitrate and/or hydroxide becomes insufficient.

Raw-Material Compounds

In the present invention, the following are used as for raw materials: a lithium-silicate compound that is expressed by $Li_2SiO_3$; and a transition-metal-element-containing substance that includes at least one member being selected from the group consisting of iron and manganese.

It is not restrictive at all as to a substance including iron, and as to a substance including manganese; and so it is possible to use the following: iron in metallic state; manganese in metallic state; compounds including iron whose valency is up to divalent; compounds including manganese whose valency is up to divalent; and the like. In particular, it is preferable to use iron, manganese oxide, and so forth, so that these are likely to be maintained in the state of being divalent iron or divalent manganese at the time of reactions. It is possible to use either one of a substance including iron and a substance including manganese, or to mix both of them in order to use.

Although the transition-metal-element-containing substance being employed in the present includes iron or manganese as an essential element, it can further include another metallic element as well, if needed. As for another metallic element, it is possible to exemplify at least one member being selected from the group consisting of Mg, Ca, Co, Al, Ni, Nb, Ti, Cr, Cu, Zn, Zr, V, Mo, and W. The transition-metal-element-containing substance including these metallic elements can also be metallic elements in metallic state; alternatively, it can even be compounds including metallic elements whose valency is up to divalent, such as sulfates, carbonates and hydroxides, for instance. The transition-metal-element-containing substance can also be substances including a member of the other metallic elements alone; alternatively, it can even be substances including two or more members of the other metallic elements simultaneously. It is possible for the transition-metal-element-containing substance to use a member of compounds independently, or to mix two or more members of compounds in order to use. That is, The transition-metal-element-containing substance can specifically include a substance including iron and/or manganese as an essential element, and can further include one member or two or more members of the following, if needed: cobalt oxide, magnesium oxide, calcium carbonate, calcium oxide, aluminum oxide, nickel oxide, niobium oxide, lithium titanate, chromium (III) oxide, copper (II) acetate, zinc oxide, zirconium oxide, vanadium carbide, lithium molybdate, and lithium tungstate.

In the transition-metal-element-containing substance, it is necessary for a content of iron and/or manganese that the iron and/or manganese can make 50% by mol or more when a summed amount of metallic elements is taken as 100% by mol. In other words, it is possible to set an amount of at least one member of metallic elements, which is selected from the group consisting of Mg, Ca, Co, Al, Ni, Nb, Ti, Cr, Cu, Zn, Zr, V, Mo and W, at from 0 to 50% by mole when a summed amount of metallic elements is taken as 100% by mol.

As to a mixing proportion between the lithium-silicate compound being expressed by $Li_2SiO_3$ and the transition-metal-element-containing substance, it is usually preferable to set a summed amount of metallic elements being included in the transition-metal-element-containing substance at such an amount that makes from 0.9 to 1.2 mol, or it is more preferable to set it at such amount that makes from 0.95 to 1.1 mol, with respect to 1 mol of the lithium-silicate compound.

Production Process for Lithium-Silicate-Based Compound

In a production process for lithium-silicate-based compound according to the present invention, it is necessary to react the above-mentioned raw-material compounds one another at 550° C. or less within the above-mentioned molten salt in an atmosphere in the presence of a mixed gas including carbon dioxide and a reducing gas.

Although it is not at all restrictive especially as to a specific reaction method, it is usually advisable to mix the nitrate and/or hydroxide, lithium-silicate compound and transition-metal-element-containing substance that have been mentioned above one another, and then to melt the nitrate and/or hydroxide by doing heating after mixing them uniformly with use of a ball mill, and the like. By means of this, the reaction between the lithium-silicate compound and the transition metal element progresses within the resulting molten salt, and thereby it is possible to obtain a targeted lithium-silicate-based compound.

On this occasion, it is not at all restrictive especially as to the mixing proportion between the raw materials, which comprise the lithium-silicate compound and the transition-metal-element-containing substance, and the nitrate and/or hydroxide (namely, the resulting molten salt), and so it can be made up of amounts that enable the raw materials to disperse uniformly within the resultant molten salt. For example, it is preferable that, with respect to a summed amount of the lithium-silicate compound and transition-metal-element-containing substance that is taken as 100 parts by mass, a summed amount of the resulting molten salt can make an amount that falls in a range of from 90 to 300 parts by mass, and it is more preferable that the summed amount can make an amount that falls in a range of from 90 to 250 parts by mass, or furthermore from 100 to 150 parts by mass.

It is advisable that a temperature of the reaction between the lithium-silicate compound and the transition-metal-element-containing substance within the resulting molten salt can be 550° C. or less. In particular, being from 150 to 550° C., or furthermore being from 300 to 550° C., is preferable. In particular, being from 375 to 525° C. is preferable, because the reaction proceeds at practical rates. In order to enhance the resultant cyclability and rate characteristic, the lower the reaction temperature is the more preferable it is. However, being less than 150° C. is not practical, because $O^{2-}$ is less likely to be released into the resulting molten salt, and because it takes a long period of time until lithium-silicate-based compounds are synthesized. Moreover, going beyond 550° C. is not preferable, because the particles of obtainable lithium-silicate-based compounds become likely to coarsen.

The reaction being mentioned above is carried out in an atmosphere in the presence of a mixed gas including carbon dioxide and a reducing gas in order to let the transition metal element exist stably as divalent ions within the resulting molten salt during the reaction. In the presence of this atmosphere, it becomes feasible to stably maintain the transition metal element in the divalent state. As to a ratio between carbon dioxide and a reducing gas, it is advisable to set the reducing gas so as to make from 0.01 to 0.4 mol, for instance, and it is preferable to set it so as to make from 0.03 to 0.3 mol, with respect to one mol of the carbon dioxide. As for the reducing gas, it is possible to use hydrogen, carbon monoxide, and the like, for instance, and hydrogen is preferable especially.

As to a pressure of the mixed gas of carbon dioxide and a reducing gas, there are not any limitations especially. Although it is usually advisable to set it at an atmospheric pressure, it is even good to put the mixed gas either in a pressurized condition or in a depressurized condition.

It is usually allowable to set a time for the reaction between the lithium-silicate compound and the transition-metal-element-containing substance at from 10 minutes to 70 hours. Preferably, it is permissible to set it at from 5 to 25 hours, or furthermore at from 10 to 20 hours.

Lithium-silicate-based compounds are obtainable by means of cooling and then removing the alkali-metal nitrate and/or alkali-metal hydroxide, which has been used as a flux, after completing the above-mentioned reaction.

As for a method of removing the alkali-metal nitrate and/or alkali-metal hydroxide, it is allowable to dissolve and then remove the alkali-metal nitrate and/or alkali-metal hydroxide by washing products with use of a solvent that is capable of dissolving the alkali-metal nitrate and/or alkali-metal hydroxide having been solidified by means of the post-reaction cooling. For example, it is permissible to use water as the solvent.

Lithium-Silicate-Based Compound

A lithium-silicate-based compound that is obtainable by means of the process being mentioned above is a compound that is expressed by a compositional formula:

$$Li_{2+a-b}A_bM_{1-x}M'_xSiO_{4+c}$$

(In the formula, "A" is at least one element that is selected from the group consisting of Na, K, Rb and Cs; "M" is at least one element that is selected from the group consisting of Fe and Mn; "M'" is at least one element that is selected from the group consisting of Mg, Ca, Co, Al, Ni, Nb, Ti, Cr, Cu, Zn, Zr, V, Mo and W; and the respective subscripts are specified as follows: $0 \leq "x" \leq 0.5$; $0 \leq "a" < 1$; $0 \leq "b" < 0.2$; and $0 < "c" < 0.3$).

In a case where lithium nitrate and/or lithium hydroxide is included within a molten salt, this compound becomes a compound that includes Li ions excessively, compared with the stoichiometric amount, because lithium ions within the resulting molten salt force into the Li-ion sites of lithium-silicate-based compound interstitially. That is, the subscript "a" in the above-mentioned compositional formula becomes $0 < "a" < 1$. Moreover, since the growth of crystal grains is inhibited by means of carrying out the reaction at such a low temperature as 550° C. or less within the resultant molten salt, the compound makes such fine particles whose average particle diameters are from 40 nm to 15 μm, or furthermore from 50 nm to 10 μm. In addition, the amount of impurity phases is decreased greatly. As a result, in the case of being used as a positive-electrode active material for lithium-ion secondary battery, the compound makes materials having high capacities along with showing favorable cyclabilities and rate characteristics. It is especially preferable that a lithium-silicate-based compound being obtainable by the process that has been mentioned above can be those whose average particle diameters fall in a range of from 40 nm to 1 μm. Note that it is possible to find the average particle diameters by means of a laser-diffraction particle-size-distribution measuring apparatus (e.g., "SALD-7100" produced by SHIMADZU Co., Ltd.) or electron microscopes, such as TEM and SEM. For example, it is advisable to observe the resulting lithium-silicate-based compound with an electron microscope; then measure a maximum value of intervals between two parallel lines when identifiable particles' particle diameters are held between the parallel lines; and employ a number average value of those particle particles as an average particle diameter of those particles.

Carbon-Coating Treatment

In the lithium-silicate-based compound that is obtainable by the process being mentioned above, and which is exhibited by the compositional formula: $Li_{2+a-b}A_bM_{1-x}M'_xSiO_{4+c}$, it is preferable to further carry out a coating treatment by means of carbon in order to upgrade the conductivity.

As to a specific method of the carbon-coating treatment, it is not at all restrictive especially. As for a method of the carbon-coating treatment, in addition to a gas-phase method in which heat treatment is carried out in an atmosphere including a carbon-containing gas like butane gas, it is feasible to apply it a thermal decomposition method in which an organic substance making a carbonaceous source is carbonized by means of heat treatment after mixing the organic substance with the lithium-silicate-based compound uniformly. In particular, it is preferable to apply it a ball-milling method in which a heat treatment is carried out after adding a carbonaceous material and $Li_2CO_3$ to the aforementioned lithium-silicate-based compound and then mixing them uniformly by means of ball milling until the resulting lithium-silicate-based compound turns into being amorphous. In accordance with this method, the lithium-silicate-based compound serving as a positive-electrode active material is turned into being amorphous by means of ball milling, and is thereby mixed uniformly with carbon so that the adhesiveness increases. In addition, it is possible to do coating, because carbon precipitates uniformly around the resultant lithium-silicate-based compound by means of the heat treatment, simultaneously with the recrystallization of the lithium-silicate-based compound. On this occasion, due to the fact that $Li_2CO_3$ exists, the resulting lithium-rich silicate-based compound does not at all turn into being deficient in lithium, but becomes one which shows a high charging/discharging capacity.

As to an extent of turning into being amorphous, it is advisable that a ratio, $B(011)_{crystal}/B(011)_{mill}$, can fall in a range of from 0.1 to 0.5 approximately in a case where a half-value width of the diffraction peak being derived from the (011) plane regarding a sample having crystallinity before being subjected to ball milling is labeled $B(011)_{crystal}$ and another half-value width of the diffraction peak being derived from the (011) plane of the sample being obtained by means of ball milling is labeled $B(011)_{mill}$ in an X-ray diffraction measurement in which the $K_\alpha$ ray of Cu serves as the light source.

In this method, it is possible to use acetylene black (or AB), KETJENBLACK (or KB), graphite, and the like, as for the carbonaceous material.

As to a mixing proportion between the lithium-silicate-based compound, a carbonaceous material and $Li_2CO_3$, it is advisable to set it at from 20 to 40 parts by mass for the carbonaceous material and to set it at from 20 to 40 parts by mass for $Li_2CO_3$, respectively, with respect to the lithium-silicate-based compound being taken as 100 parts by mass.

The heat treatment is carried out after carrying out a ball-milling treatment until the lithium-silicate-based compound turns into being amorphous. The heat treatment is carried out in the presence of a reducing atmosphere in order to retain transition metal ions being included in the resulting lithium-silicate-based compound at divalence. As for the reducing atmosphere in this case, it is preferable to be within a mixed-gas atmosphere of carbon dioxide and a reducing gas in order to inhibit the divalent transition metal ions from being reduced to the metallic states, in the same manner as the synthesis reaction of the lithium-silicate-based compound within the molten salt. It is advisable to set a mixing proportion of carbon dioxide and that of a reducing gas similarly to those at the time of the synthesis reaction of the lithium-silicate-based compound.

It is preferable to set a temperature of the heat treatment at from 500 to 800° C. In a case where the heat-treatment temperature is too low, it is difficult to uniformly precipitate carbon around the resulting lithium-silicate-based compound. On the other hand, the heat-treatment temperature being too high is not preferable, because the decomposition or lithium deficiency might occur in the resultant lithium-silicate-based compound and thereby the resulting charging/discharging capacity declines. Moreover, it is usually advisable to set a time for the heat treatment at from 1 to 10 hours.

Moreover, as another method of the carbon-coating treatment, it is even advisable to carry out the heat treatment after adding a carbonaceous material and LiF to the aforementioned lithium-silicate-based compound and then mixing them uniformly by means of ball milling until the resulting lithium-silicate-based compound turns into being amorphous in the same manner as the method being mentioned above. In this instance, simultaneously with the recrystallization of the lithium-silicate-based compound, carbon precipitates uniformly around the resultant lithium-silicate-based compound to coat it and then upgrade it in the conductivity. In addition, fluorine atoms substitute for a part of oxygen atoms in the resulting lithium-silicate-based compound. Thus, a fluorine-containing lithium-silicate-based compound can be formed, the fluorine-containing lithium-silicate-based compound being expressed by a compositional formula:

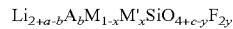

$Li_{2+a-b}A_bM_{1-x}M'_xSiO_{4+c-y}F_{2y}$ (In the formula, "A" is at least one element that is selected from the group consisting of Na, K, Rb and Cs; "M" is Fe or Mn; "M'" is at least one element that is selected from the group consisting of Mg, Ca, Co, Al, Ni, Nb, T Cr, Cu, Zn, Zr, V, Mo and W; and the respective subscripts are specified as follows: 0≤"x"≤0.5; 0≤"a"<1; 0≤"b"<0.2; 0<"c"<0.3; and 0<"y"<1).

This compound makes a positive-electrode material that has much better performance, because the resulting average voltage is raised from 2.6 V to 2.8 V by means of added F in a case where it is used as a positive electrode. On this occasion, the resultant lithium-rich silicate-based compound makes one which shows a high charging/discharging capacity, because it does not at all turn into being poor in lithium, due to the presence of LiF.

In this method, as to a mixing proportion between the lithium-silicate-based compound, a carbonaceous material and LiF, it is allowable to set it at from 20 to 40 parts by mass for the carbonaceous material and to set it at from 10 to 40 parts by mass for LiF, respectively, with respect to the lithium-silicate-based compound being taken as 100 parts by mass. In addition, it is even good that $Li_2CO_3$ can be further included, if needed. As to conditions of the ball milling and heat treatment, it is permissible to set them similarly to those in the case that has been mentioned above.

Positive Electrode for Lithium-Ion Secondary Battery

It is possible to effectively employ any one of the following as an active material for the positive electrode of lithium-ion secondary battery (or an active material for the positive electrode of lithium secondary battery): the lithium-silicate-based compound that is obtainable by doing the synthesis within the molten salt being mentioned above; the lithium-silicate-based compound to which the carbon-coating treatment is carried out; and the lithium-silicate-based compound to which fluorine is added. It is possible for a positive electrode using one of these lithium-silicate-based compounds to have the same structure as that of an ordinary positive electrode for lithium-ion secondary battery.

For example, it is possible to fabricate a positive electrode by means of adding a conductive additive, such as acetylene black (or AB), KETJENBLACK (or KB) or gas-phase method carbon fiber (e.g., vapor growth carbon fiber (or VGCF)), a binder, such as polyvinylidene fluoride (e.g., polyvinylidene difluoride (or PVdF)), polytetrafluoroethylene (or PTFE) or styrene-butadiene rubber (or SBR), and a solvent, such as N-methyl-2-pyrolidione (or NMP), to one of the aforementioned lithium-silicate-based compounds, turning these into being pasty, and then coating the resulting pasty product onto a current collector. As to an employment amount of the conductive additive, although it is not at all restrictive especially, it is possible to set it in an amount of from 5 to 20 parts by mass with respect to the lithium-silicate-based compound being taken as 100 parts by mass, for instance. Moreover, as to an employment amount of the binder, although it is not at all restrictive especially, either, it is possible to set it in an amount of from 5 to 20 parts by mass with respect to the lithium-silicate-based compound being taken as 100 parts by mass, for instance. Moreover, as another method, a positive electrode can also be manufactured by means of such a method in which one being made by mixing the lithium-silicate-based compound with the above-mentioned conductive additive and binder is kneaded as a film shape with use of a mortar or pressing machine and then the resultant film-shaped product is press bonded onto a current collector by a pressing machine.

As for the current collector, there are not any limitations especially, and so it is possible to use materials that have been heretofore employed conventionally as positive electrodes for lithium-ion secondary battery, such as aluminum foils, aluminum meshes and stainless steel meshes, for instance. In addition, it is possible to employ, as the current collector, carbon nonwoven fabrics and carbon woven fabrics as well.

In the positive electrode for lithium-ion secondary battery according to the present invention, it is not at all restrictive especially as to its configuration, thickness, and the like. However, it is preferable to set the thickness at from 10 to 200 μm, more preferably, at from 20 to 100 μm, for instance, by means of compressing the active material after filling it up. Therefore, it is advisable to suitably determine a fill-up amount of the active material so as to make the aforementioned thickness after being compressed, in compliance with the types, structures, and so forth, of current collectors to be employed.

Lithium-Silicate-Based Compound Under Charged Condition or Discharged Condition in the lithium-silicate-based compound that is obtainable by reacting the raw-material compounds within the molten salt of alkali-metal nitrate and/or alkali-metal hydroxide by means of the process being mentioned above, the lithium-silicate-based compound to which the carbon-coating treatment has been carried out, and the lithium-silicate-based compound to which fluorine has been added, their crystal structures change by means of manufacturing lithium-ion secondary batteries with use of these as the positive-electrode active materials for the lithium-ion secondary batteries and then carrying out charging and discharging. A stable charging/discharging capacity comes to be obtainable because the structure changes to be stabilized by means of charging/discharging, although the lithium-silicate-based compound being obtained by doing the synthesis within the molten salt is unstable in the structure and is also less in the charging capacity. It is possible to maintain the stability highly, although the lithium-silicate-based compound comes to have different structures, respectively, under a charged condition and under a discharged condition, after its crystal structure is once changed by carrying out charging/discharging.

It is believed that this stabilization of the structure results from the following: on the occasion of synthesizing the lithium-silicate-based compound by means of the molten-salt method, alkali-metal ions (e.g., Na or K) that do not contribute to charging/discharging are introduced into the resulting lithium-silicate-based compound because they substitute for apart of the Li sites; and thereby the crystal structure is stabilized; and hence the crystal structure is maintained even when Li undergoes charging/discharging. In addition, since the ionic radius of Na (i.e., about 0.99 Å) and the ionic radius of K (i.e., about 1.37 Å) are larger than the ionic radius of Li (i.e., about 0.590 Å), the movement of Li becomes likely to occur, and so the insertion/elimination amount of Li increases, and hence it is believed to consequently lead to upgrading the charging/discharging capacity. Although a charging method and a discharging method for this instance are not at all limited especially, it is good to cause constant-electric-current charging/discharging with an electric-current value of 0.1 C for the resulting battery capacity. Although it is advisable to determine a voltage at the time of charging and discharging in compliance with the constituent elements of lithium-ion secondary battery, it is usually possible to set it in a range of from 4.5 V to 1.0 V approximately, and it is preferable to set it in a range of from 4.2 V to 1.5 V approximately, in a case where metallic lithium makes the counter electrode.

Hereinafter, crystal structures of each of the lithium-silicate-based compounds under a charged condition and under a discharged condition will be explained while giving specific examples.

(i) Iron-Containing Lithium-silicate-based compound

First of all, an iron-containing lithium-silicate-based compound will be explained, iron-containing lithium-silicate-based compound which has been obtained by doing synthesis within a molten salt, and which is expressed by a compositional formula, $Li_{2+a-b}A_bFeSiO_{4+c}$ (in the formula, "A" is at least one element that is selected from the group consisting of Na, K, Rb and Cs; and the respective subscripts are specified as follows: $0 \leq "a" < 1$; $0 \leq "b" < 0.2$; and $0 < "c" < 0.3$).

By means of carrying out constant-current charging up to 4.2 V for a lithium-ion secondary battery that uses the aforesaid iron-containing lithium-silicate-based compound as the positive-electrode active material, and which uses lithium metal as the negative-electrode active material, an obtainable lithium-silicate-based compound under the charged condition turns into one which is expressed by a compositional formula, $Li_{1+a-b}A_bFeSiO_{4+c}$ (in the formula, "A," "a," "b," and "c" are the same as those aforementioned).

When an X-ray diffraction measurement is carried out for the aforesaid compound with use of an X-ray whose wavelength is 0.7 Å, the relative intensities, diffraction angles and half-width values of five pieces of the resulting diffraction peaks whose relative strengths are the highest turn into the following values, respectively, in a range where the diffraction angles (or 2θ) are from 5 degrees to 40 degrees. Note that the diffraction angles and half-value widths fall within a range of ±0.03 degrees approximately about the following values.

First Peak: 100% relative intensity, 10.10-degree diffraction angle, and 0.11-degree half-value width;
Second Peak: 81% relative intensity, 16.06-degree diffraction angle, and 0.10-degree half-value width;
Third Peak: 76% relative intensity, 9.88-degree diffraction angle, and 0.14-degree half-value width;
Fourth Peak: 58% relative intensity, 14.54-degree diffraction angle, and 0.16-degree half-value width; and
Fifth Peak: 47% relative intensity, 15.50-degree diffraction angle, and 0.12-degree half-value width When the X-ray diffraction measurement is carried out for the aforesaid compound with use of the X-ray whose wavelength is 0.7 Å, and then as a result of doing a structural analysis to a diffraction pattern, which has been obtained by carrying out the X-ray diffraction measurement with use of the X-ray whose wavelength is 0.7 Å, with a model in which the irregularization of lithium ions and iron ions has been taken into account, it has a crystal structure as described below. That is, the lithium-silicate-based compound under the charged condition has the following characteristics: the crystal system: orthorhombic crystal; the space group: $P2_1$; lattice parameters: a=8.3576 Å, b=5.0276 Å, c=8.3940 Å, and β=103.524 degrees; and the volume: 342.9 Å$^3$. Note that, for the above-mentioned crystal structure, the values of the lattice parameters fall within a range of ±0.005.

Since the diffraction peaks being mentioned above are different from the diffraction peaks of the iron-containing lithium-silicate-based compound that has been synthesized within the molten salt, it is possible to ascertain that the crystal structure changes by means of charging.

Note that it is possible to measure the diffraction peaks being mentioned above by the subsequent method, for instance.

First of all, a charged electrode is washed with a linear carbonate-ester-based solvent several times, thereby removing impurities being adhered on the surfaces of the electrode. Thereafter, an electrode layer (not including the current collector) is peeled off from the obtained electrode after doing vacuum drying, is then filled up into a glass capillary, and is encapsulated in it using an epoxy-resin adhesive agent. Thereafter, it is possible to identify the lithium-silicate-based compound under charged conditions by doing an X-ray diffraction-pattern measurement with use of an X-ray whose wavelength is 0.7 Å. On this occasion, as for the linear carbonate-ester-based solvent, it is possible to use dimethyl carbonate (or DMC), diethyl carbonate (or DEC), ethyl methyl carbonate (or EMC), and the like.

Moreover, when the iron-containing lithium-silicate-based compound, which has been subjected to the charging up to 4.2 V by the method being mentioned above, is then subjected to constant-current discharging down to 1.5V, an obtainable lithium-silicate-based compound under the discharged condition turns into one which is expressed by a compositional formula, $Li_{2+a-b}A_bFeSiO_{4+c}$ (in the formula, "A," "a," "b," and "c" are the same as those aforementioned). When an X-ray diffraction measurement is carried out for the aforesaid compound with use of an X-ray whose wavelength is 0.7 Å, the relative intensities, diffraction angles and half-width values of five pieces of the resulting diffraction peaks whose relative strengths are the highest turn into the following values, respectively, in a range where the diffraction angles (or 2θ) are from 5 degrees to 40 degrees. Note that the diffraction angles and half-value widths fall within a range of ±0.03 degrees approximately about the following values.

First Peak: 100% relative intensity, 16.07-degree diffraction angle, and 0.08-degree half-value width;
Second Peak: 71% relative intensity, 14.92-degree diffraction angle, and 0.17-degree half-value width;
Third Peak: 44% relative intensity, 10.30-degree diffraction angle, and 0.08-degree half-value width;
Fourth Peak: 29% relative intensity, 9.82-degree diffraction angle, and 0.11-degree half-value width; and
Fifth Peak: 26% relative intensity, 21.98-degree diffraction angle, and 0.14-degree half-value width When the X-ray diffraction measurement is carried out for the aforesaid compound with use of the X-ray whose wavelength is 0.7 Å, and then as a result of doing a structural analysis to a diffraction pattern, which has been obtained by carrying out the X-ray diffraction measurement with use of the X-ray whose wavelength is 0.7 Å, with a model in which the irregularization of lithium ions and iron ions has been taken into account, it has a crystal structure as described below. That is, the lithium-silicate-based compound under the discharged condition has the following characteristics: the crystal system: orthorhombic crystal; the space group: $P2_1$; lattice parameters: a=8.319 Å, b=5.0275 Å, c=8.2569 Å, and β=98.47 degrees; and the lattice volume: 341.6 Å$^3$. Note that, for the above-mentioned crystal structure, the values of the lattice parameters fall within a range of ±0.005.

Since the diffraction peaks being mentioned above are all different from any of the following: the diffraction peaks of the iron-containing lithium-silicate-based compound that has been synthesized within the molten salt; and the diffraction peaks of the post-charging iron-containing lithium-silicate-based compound, it is possible to ascertain that the crystal structure changes by means of discharging as well.

(ii) Manganese-Containing Lithium-silicate-based compound

Next, a manganese-containing lithium-silicate-based compound will be explained, manganese-containing lithium-silicate-based compound which is obtained by doing synthesis within a molten salt, and which is expressed by a compositional formula, $Li_{2+a-b}A_bMnSiO_{4+c}$ (in the formula, "A" is at least one element that is selected from the group consisting of Na, K, Rb and Cs; and the respective subscripts are specified as follows: 0≤"a"<1; 0≤"b"<0.2; and 0<"c"<0.3).

By means of carrying out constant-current charging up to 4.2 V for a lithium-ion secondary battery that uses the aforesaid lithium-silicate-based compound as the positive-electrode active material, and which uses lithium metal as the negative-electrode material, an obtainable lithium-silicate-based compound under the charged condition turns into one which is expressed by a compositional formula, $Li_{1+a-b}A_{b-}MnSiO_{4+c}$ (in the formula, "A," "a," "b," and "c" are the same as those aforementioned).

When an X-ray diffraction measurement is carried out for the aforesaid compound with use of an X-ray whose wavelength is 0.7 Å, the relative intensities, diffraction angles and half-width values of five pieces of the resulting diffraction peaks whose relative strengths are the highest turn into the following values, respectively, in a range where the diffraction angles (or 2θ) are from 5 degrees to 40 degrees. Note that the diffraction angles and half-value widths fall within a range of ±0.03 degrees approximately about the following values.

First Peak: 100% relative intensity, 8.15-degree diffraction angle, and 0.18-degree half-value width;

Second Peak: 64% relative intensity, 11.60-degree diffraction angle, and 0.46-degree half-value width;

Third Peak: 41% relative intensity, 17.17-degree diffraction angle, and 0.18-degree half-value width;

Fourth Peak: 37% relative intensity, 11.04-degree diffraction angle, and 0.31-degree half-value width; and Fifth Peak: 34% relative intensity, 19.87-degree diffraction angle, and 0.29-degree half-value width Since the diffraction peaks being mentioned above are different from the diffraction peaks of the manganese-containing lithium-silicate-based compound that has been synthesized within the molten salt, it is possible to ascertain that the crystal structure changes by means of charging.

Moreover, when the manganese-containing lithium-silicate-based compound, which has been subjected to the charging up to 4.2 V by the method being mentioned above, is then subjected to constant-current discharging down to 1.5 V, an obtainable manganese-containing lithium-silicate-based compound under the discharged condition turns into one which is expressed by a compositional formula, $Li_{2+a-b}A_b MnSiO_{4+c}$ (in the formula, "A," "a," "b," and "c" are the same as those aforementioned). When an X-ray diffraction measurement is carried out for the aforesaid compound with use of an X-ray whose wavelength is 0.7 Å, the relative intensities, diffraction angles and half-width values of five pieces of the resulting diffraction peaks whose relative strengths are the highest turn into the following values, respectively, in a range where the diffraction angles (or 2θ) are from 5 degrees to 40 degrees. Note that the diffraction angles and half-value widths fall within a range of ±0.03 degrees approximately about the following values.

First Peak: 100% relative intensity, 8.16-degree diffraction angle, and 0.22-degree half-value width;

Second Peak: 71% relative intensity, 11.53-degree diffraction angle, and 0.40-degree half-value width;

Third Peak: 67% relative intensity, 11.66-degree diffraction angle, and 0.53-degree half-value width;

Fourth Peak: 61% relative intensity, 11.03-degree diffraction angle, and 0.065-degree half-value width; and Fifth Peak: 52% relative intensity, 11.35-degree diffraction angle, and 0.70-degree half-value width Since the diffraction peaks being mentioned above are all different from any of the following: the diffraction peaks of the manganese-containing lithium-silicate-based compound that has been synthesized within the molten salt; and the diffraction peaks of the post-charging manganese-containing lithium-silicate-based compound, it is possible to ascertain that the crystal structure changes by means of discharging as well.

Note that, in each of the iron-containing lithium-silicate-based compound and manganese-containing lithium-silicate-based compound that have been mentioned above, it is preferable that a substitution amount of element "A," namely, the value of "b," can be from 0.0001 to 0.05 approximately, and it is more preferable that it can be from 0.0005 to 0.02 approximately.

Lithium-Ion Secondary Battery

It is possible to manufacture a lithium-ion secondary battery (or a lithium secondary battery) that uses the positive electrode being mentioned above by means of publicly-known methods. That is, it is advisable to follow an ordinary process in order to assemble a lithium-ion secondary battery while employing the positive electrode being mentioned above as a positive-electrode material; employing publicly-known metallic lithium, a carbon-based material such as graphite, a silicon-based material such as silicon thin film, an alloy-based material such as copper-tin or cobalt-tin, or an oxide material such as lithium titanate, as a negative-electrode material; employing a solution, in which a lithium salt, such as lithium perchlorate, $LiPF_6$, $LiBF_4$ or $LiCF_3SO_3$, is dissolved in a concentration of from 0.5 mol/L to 1.7 mol/L in a publicly-known nonaqueous-based solvent, such as ethylene carbonate, dimethyl carbonate, propylene carbonate or dimethyl carbonate, as an electrolytic solution; and further employing the other publicly-known constituent elements for battery.

EXAMPLES

Hereinafter, the present invention will be explained in more detail while giving examples.

Example No. 1

Synthesis of Iron-Containing Lithium-Silicate Compound 20-mL acetone was added to a mixture of 0.03 mol of iron (produced by KOHJUNDO KAGAKU Co. Ltd., and with 99.9% purity), and 0.03 mol of lithium silicate, $Li_2SiO_3$ (produced by KISHIDA KAGAKU Co. Ltd., and with 99.5% purity), and was dried after being mixed with the mixture by a ball mill made of zirconia at a rate of 500 rpm for 60 minutes. This one was further mixed in a mortar along with a nitrate mixture. The used nitrate mixture was one in which lithium nitrate (produced by KISHIDA KAGAKU, and with 99% purity) and potassium nitrate (produced by KISHIDA KAGAKU, and with 99% purity) were mixed in such a ratio as (Lithium Nitrate):(Potassium Nitrate) being equal to 41:59 by molar ratio. Moreover, a proportion of the nitrate mixture was set at 120 parts by mass with respect to a summed amount of the iron and lithium silicate being taken as 100 parts by mass.

The thus obtained powder was heated in a golden crucible with use of an electric furnace, and was then heated to 500° C. in an atmosphere in the presence of a mixed gas of carbon dioxide (e.g., 100-mL/min flow volume) and hydrogen (e.g., 3-mL/min flow volume) in order to react them for 13 hours in a state where the nitrate mixture was fused.

After the reaction, the entirety of a reactor core including the golden crucible, namely, the reaction system, was taken from out of the electric furnace, and was then cooled rapidly down to room temperature while keeping letting the mixed gas pass through.

Subsequently, the resulting solidified reaction product was grounded with a mortar after adding water (e.g., 20 mL) to it. Then, it was filtered after dissolving it into water in order to remove salts, and the like, thereby obtaining a powder of iron-containing lithium-silicate-based compound.

For the thus obtained product, an X-ray diffraction measurement was carried out by means of a powder X-ray diffraction apparatus with use of the $CuK_\alpha$ ray. The resulting XRD pattern is shown in FIG. 1. This XRD pattern agreed with the reported pattern of monoclinic-crystal $Li_2FeSiO_4$ in the space group "$P2_1$" virtually.

Moreover, when observing the obtained product with use of a transmission electron microscope (or TEM), particles whose particle diameters were from 50 nm to 15 μm approximately were observed. When calculating the average particle diameter by means of the above-described method, it was 500 nm.

Example No. 2

Synthesis of Manganese-Containing Lithium-Silicate Compound

Instead of the iron used in Example No. 1, manganese oxide (II) (produced by KOHJUNDO KAGAKU Co. Ltd., and with 99.9% purity) was used in an amount of 0.03 mol, and then a powder of manganese-containing lithium-silicate-based compound was obtained under the same synthesis conditions as those of Example No. 1.

Figure 2:
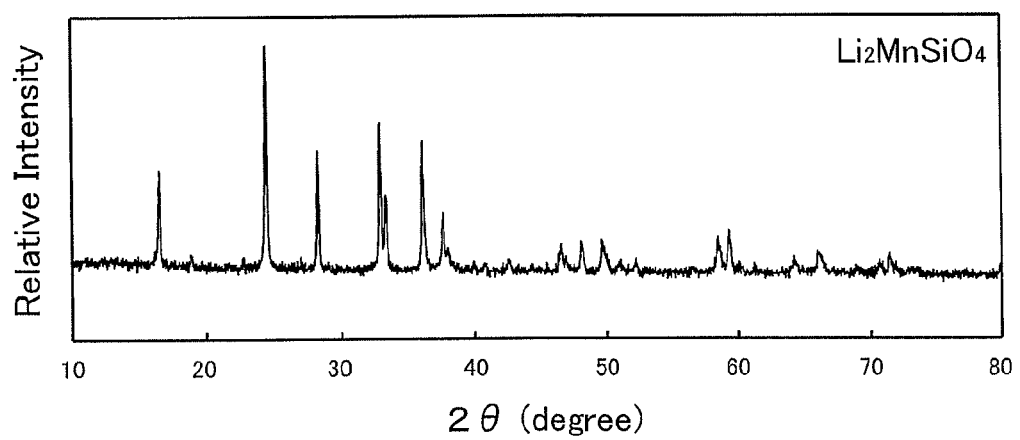
FIG. 2 illustrates an X-ray diffraction pattern of a compound that was synthesized by means of a process according to Example No. 2.

An X-ray diffraction measurement was carried out for the obtained product by means of a powder X-ray diffraction apparatus with use of the $CuK_\alpha$ ray. The resulting XRD pattern is shown in FIG. 2. The XRD pattern of this product agreed with the XRD pattern of orthorhombic-crystal $Li_2MnSiO_4$ in the space group "$Pmn2_1$" virtually.

Moreover, when observing the obtained product with use of a transmission electron microscope (or TEM), particles whose particle diameters were from 50 nm to 15 μm approximately were observed. When calculating the average particle diameter, it was 300 nm.

Example No. 3

Synthesis of Iron-Containing Lithium-Silicate Compound

A nitrate-carbonate mixture was obtained by mixing the following nitrate mixture as well as carbonate mixture by means of a mortar so that they made a ratio, (Nitrates):(Carbonates)=1:1 by mass ratio: a nitrate mixture in which the above-mentioned lithium nitrate and potassium nitrate were mixed in such a ratio as (Lithium Nitrate):(Potassium Nitrate) being equal to 41:59 by molar ratio; as well as a carbonate mixture in which lithium carbonate (produced by KISHIDA KAGAKU, and with 99.5% purity), sodium carbonate (produced by KISHIDA KAGAKU, and with 99.5% purity), and potassium carbonate (produced by KISHIDA KAGAKU, and with 99.5% purity) were mixed in such a ratio as (Lithium Carbonate):(Sodium Carbonate):(Potassium Carbonate) being equal to 43.5:31.5:25 by molar ratio.

0.03 mol of the above-mentioned iron, 0.03 mol of the above-mentioned lithium silicate, 20 mL of acetone were mixed by a ball mill made of zirconia at a rate of 500 rpm for 60 minutes, and were then dried. This one was further mixed in a mortar along with the nitrate-carbonate mixture. A mixing proportion was set at 120 parts by mass for a sum of the nitrate-carbonate mixture with respect to a summed amount of the iron and lithium silicate being taken as 100 parts by mass.

The thus obtained mixed powder was heated in a hydrogen atmosphere (e.g., 100-mL/min flow volume) with use of an electric furnace. Then, after retaining it at 400° C. for 3 hours, it was further retained thereat in an atmosphere in the presence of a mixed gas of carbon dioxide (e.g., 70-mL/min flow volume) and hydrogen (e.g., 30-mL/min flow volume) for another 65 hours. That is, it was reacted at 400° C. for 68 hours in a state where the nitrate-carbonate mixture was fused.

After the reaction, the entirety of a reactor core, namely, the reaction system, was taken from out of the electric furnace, and was then cooled rapidly down to room temperature while keeping letting the mixed gas pass through.

Subsequently, the resulting solidified reaction product was grounded with a mortar after adding water (e.g., 20 mL) to it. Then, it was filtered after dissolving it into water in order to remove salts, and the like, thereby obtaining a powder of iron-containing lithium-silicate-based compound.

An X-ray diffraction measurement was carried out for the obtained product by means of a powder X-ray diffraction apparatus with use of the $CuK_\alpha$ ray. This XRD pattern agreed with the reported pattern of monoclinic-crystal $Li_2FeSiO_4$ in the space group "$P2_1$" virtually. That is, even when the reaction temperature was set at 400° C., a product was obtained, product which was equivalent to that according Example No. 1 that was reacted at 500° C.

Moreover, when observing the obtained product with use of a transmission electron microscope (or TEM), particles whose particle diameters were from 40 nm to 10 μm approximately were observed. When calculating the average particle diameter, it was 550 nm.

Example No. 4

Synthesis of Manganese-Containing Lithium-Silicate Compound

Instead of the iron used in Example No. 3, the above-mentioned manganese oxide was used in an amount of 0.03 mol, and then a powder of manganese-containing lithium-silicate-based compound was obtained under the same synthesis conditions as those of Example No. 3.

An X-ray diffraction measurement was carried out for the obtained product by means of a powder X-ray diffraction apparatus with use of the $CuK_a$ ray. The XRD pattern of this product agreed with the XRD pattern of orthorhombic-crystal $Li_2MnSiO_4$ in the space group "$Pmn2_1$" virtually. That is, even when the reaction temperature was set at 400° C., a product was obtained, product which was equivalent to that according Example No. 2 that was reacted at 500° C.

Moreover, when observing the obtained product with use of a transmission electron microscope (or TEM), particles whose particle diameters were from 40 nm to 10 μm approximately were observed. When calculating the average particle diameter, it was 330 nm.

Comparative Example No. 1

Synthesis of Iron-Containing Lithium-Silicate Compound

An iron-containing lithium-silicate compound was synthesized by a method (i.e., a solid-phase reaction method) in which the following were heat treated at 800° C. for 6 hours after they underwent ball milling: lithium carbonate, $Li_2CO_3$; iron oxalate, $FeC_2O_4 \cdot 2H_2O$ (produced by SIGMA-ALDRICH, and with 99.99% purity); and silicon oxide, $SiO_2$.

Comparative Example No. 2

Synthesis of Manganese-Containing Lithium-Silicate Compound

A manganese-containing lithium-silicate compound was synthesized by a method (i.e., a solid-phase reaction method) in which the following were heat treated at 800° C. for 6 hours after they underwent ball milling: lithium carbonate, $Li_2CO_3$;

manganese oxalate, $MnC_2O_4 \cdot 2H_2O$ (produced by SIGMA-ALDRICH, and with 99.99% purity); and silicon oxide, $SiO_2$.

Reference Example No. 1

Synthesis of Iron-Containing Lithium-Silicate Compound

Without using any nitrate, but using a carbonate mixture in order to make a molten salt, an iron-containing lithium-silicate compound was synthesized. Hereinafter, a synthesis in a case where a carbonate mixture was used will be shown.

The following were mixed one another: a mixture of 0.03 mol of the above-mentioned iron oxalate, $FeC_2O_4 \cdot 2H_2O$, and 0.03 mol of lithium silicate, $Li_2SiO_3$ (produced by KISHIDA KAGAKU, and with 99.5% purity); and a carbonate mixture (e.g., one in which lithium carbonate (produced by KISHIDA KAGAKU, and with 99.9% purity), sodium carbonate (produced by KISHIDA KAGAKU, and with 99.5% purity), and potassium carbonate (produced by KISHIDA KAGAKU, and with 99.9% purity) were mixed in such a ratio as 43.5:31.5:25 by molar ratio). A mixing proportion was set at such a proportion that a summed amount of the iron oxalate and lithium silicate made 225 parts by mass with respect to the carbonate mixture being taken as 100 parts by mass. 20 mL of acetone were added to this one in order to mix it by a ball mill made of zirconia at a rate of 500 rpm for 60 minutes, and was then dried. Thereafter, the thus obtained powder was heated within a golden crucible, and was further heated to 550° C. in an atmosphere in the presence of a mixed gas of carbon dioxide (e.g., 100-mL/min flow volume) and hydrogen (e.g., 3-mL/min flow volume), thereby reacting it for 21 hours in a state where the carbonate mixture was fused.

After the reaction, the entirety of a reactor core, namely, the reaction system, was taken from out of an electric furnace, and was then cooled rapidly down to room temperature while keeping letting the mixed gas pass through.

Subsequently, the resulting product was grounded with a mortar after adding acetic anhydride (e.g., 20 mL) to it. Then, it was filtered after adding acetic acid (e.g., 10 mL) to it in order to react and then remove the carbonates, and the like, thereby obtaining a powder of iron-containing lithium-silicate-based compound. For the thus obtained product, an X-ray diffraction measurement was carried out by means of a powder X-ray diffraction apparatus with use of the $CuK_\alpha$ ray. This XRD pattern agreed with the reported pattern of monoclinic-crystal $Li_2FeSiO_4$ in the space group "$P2_1$" virtually.

Reference Example No. 2

Synthesis of Manganese-Containing Lithium-Silicate Compound

Instead of the iron oxalate used in Reference Example No. 1, manganese oxalate was used in an amount of 0.03 mol, and then a powder of manganese-containing lithium-silicate-based compound was obtained under the same synthesis conditions as those of Reference Example No. 1.

Making of Lithium Secondary Battery

Any one of the lithium-silicate-based compounds, which were obtained by means of the processes according to the examples and comparative examples, was used as a positive-electrode active material, thereby making a lithium secondary battery, respectively.

25 parts by mass of a mixture of acetylene black and PTFE (e.g., a mixture with a ratio, AB:PTFE=2:1 by mass) was added to 100 parts by mass of the lithium-silicate-based compounds, respectively. Then, an electrode was prepared by means of a sheet method, and was vacuum dried at 140° C. for 3 hours. Thereafter, a trial coin battery was made with use of the following: a solution serving as the electrolytic solution, solution in which $LiPF_6$ was dissolved in a concentration of 1 mol/L in a mixture having a ratio, ethylene carbonate (or EC): diethylene carbonate (or DEC)=1:1; a polypropylene film (e.g., "CELGARD 2400" produced by CELGARD) serving as the separator; and a lithium-metal foil serving as the negative electrode. As shown in Table 1, the thus obtained coin batteries were labeled #E1 through #E4, #01, #02, #C1 and #C2, respectively. A charging/discharging test was carried out at 60° C. for these coin batteries. The testing conditions were set as follows: (I) over a voltage of from 4.2 to 1.5 V with 0.1 C; or (II) over a voltage of from 4.2 to 1.5 V with 0.5 C. The following are shown in Table 1: post-five-cycle discharged voltages; averaged voltages after five cycles; and numbers of cycles where the discharged capacities could be maintained by 90%.

TABLE 1

| Battery No. | Synthesis Process for Lithium-silicate-based Compound | Testing Condition (I) 0.1C or (II) 0.5C | Post-5-cycle Discharged Capacity (mAh/g) | Post-5-cycle Averaged Voltage (V) | Number of Cycles where 90% of Initial Discharged Capacity was Maintainable |
|---|---|---|---|---|---|
| #E1 | Ex. No. 1 (i.e., Molten-salt Method) | (I) | 250 | 2.60 | 70 |
| #E3 | Ex. No. 3 (i.e., Molten-salt Method) | (I) | 253 | 2.62 | 80 |
|  |  | (II) | 190 | 2.55 | 70 |
| #C1 | Comp. Ex. No. 1 (i.e., Solid-phase Reaction Method) | (I) | 130 | 2.50 | 20 |
| #01 | Ref. Ex. No. 1 (i.e., Molten-salt Method) | (I) | 250 | 2.60 | 50 |
|  |  | (II) | 160 | 2.50 | 30 |
| #E2 | Ex. No. 2 (i.e., Molten-salt Method) | (I) | 221 | 2.80 | 40 |
| #E4 | Ex. No. 4 (i.e., Molten-salt Method) | (I) | 223 | 2.85 | 50 |
|  |  | (II) | 155 | 2.75 | 40 |

TABLE 1-continued

| Battery No. | Synthesis Process for Lithium-silicate-based Compound | Testing Condition (I) 0.1C or (II) 0.5C | Post-5-cycle Discharged Capacity (mAh/g) | Post-5-cycle Averaged Voltage (V) | Number of Cycles where 90% of Initial Discharged Capacity was Maintainable |
|---|---|---|---|---|---|
| #C2 | Comp. Ex. No. 2 (i.e., Solid-phase Reaction Method) | (I) | 100 | 2.68 | 10 |
| #02 | Ref. Ex. No. 2 (i.e., Molten-salt Method) | (I) (II) | 220 150 | 2.75 2.65 | 30 20 |

When comparing the secondary batteries, in which the iron-containing lithium-silicate compounds were used, in the performance, the discharged capacities, and the averaged voltages were so high in the batteries according to #E1, #E3 and #01 that the former was 250 mAh/g approximately, and the latter was 2.6 V approximately, under condition (I). In particular, the batteries according to #E1 and #E3 maintained 90% or more of the initial capacity up to 70 cycles, respectively. Battery #01 was superior to Battery #C1 in any one of the battery characteristics.

When comparing Battery #E3 with Battery #01 for the discharged capacities and averaged voltages, there were not any great differences in terms of the test outcomes resulting condition (I). However, when comparing the outcomes resulting from condition (I) with those resulting from condition (II) for the respective batteries, the decline in the battery characteristics, which resulted from the alteration of from 0.1 C to 0.5 C, was more noticeable in Battery #01 than in Battery #E3.

That is, it was understood, in accordance with the process according to Example No. 1 and Example No. 3 in which the molten salt of mixture including nitrate was used, lithium-silicate-based compounds with high capacities are obtainable, lithium-silicate-based compounds which are excellent in terms of the cyclabilities and rate characteristics in a case where they are used as a positive-electrode active material. This is presumed to result from the fact that the iron-containing lithium-silicate compounds were synthesized at low temperatures of 500° C. or less in Example No. 1 and Example No. 3. Note that it is presumed that, when setting the temperature of the molten salt at 550° C. in the process according to Example No. 1 or Example No. 3 in which the nitrates were employed, the reaction would be carried out to the same extent as that in Reference Example No. 1 in which no nitrate was employed.

Moreover, as to the manganese-containing lithium-silicate compounds as well, the tendencies were similar to those in the iron-containing lithium-silicate compounds that have been explained so far.

That is, it was understood that, in accordance with the process in which raw-material compounds are reacted with each other within the molten salt of mixture including nitrate, lithium-silicate-based compounds are obtainable, lithium-silicate-based compounds which are excellent in terms of battery characteristics in a case where they are used as a positive-electrode active material.

The invention claimed is:

1. A production process for lithium-silicate-based compound, comprising:

reaching a lithium-silicate compound being expressed by $Li_2SiO_3$ with a transition-metal-element-containing substance including at least one member being selected from the group consisting of iron and manganese at 550° C. or less within a mixture with a molten salt including at least two alkali-metal nitrates in an atmosphere in the presence of a mixed gas including carbon dioxide and a reducing gas, wherein the molten salt includes lithium nitrate, and a lithium-silicate-based compound formed by the process is a compound expressed by the following compositional formula(1):

$$Li_{2+a-b}A_bM_{1-x}M'_xSiO_{4+c} \qquad (1)$$

wherein, in formula (1), A is at least one element selected from the group consisting of Na, K, Rb and Cs;

M is at least one element selected from the group consisting of Fe and Mn;

M' is at least one element selected from the group consisting of Mg, Ca, Co, Al, Ni, Nb, Ti, Cr, Cu, Zn, Zr, V, Mo and W; and the respective subscripts are specified as follows:
$0 \le x \le 0.5$;
$0 < a < 1$;
$0 \le b < 0.2$; and
$0 < c < 0.3$.

2. The production process for lithium-silicate-based compound as set forth in claim 1, wherein said lithium-silicate compound and said transition-metal-element-containing substance are reacted at from 150 to 400° C.

3. The production process for lithium-silicate-based compound as set forth in claim 1, wherein said transition-metal-element-containing substance includes:

at least one transition metal element selected from the group consisting of iron and manganese in an amount of from 50 to 100% by mol; and at least one of metallic element selected from the group consisting of Mg, Ca, Co, Al, Ni, Nb, Ti, Cr, Cu, Zn, Zr, V, Mo and W in an amount of from 0 to 50% by mol;

when a summed amount of metallic elements included in the transition-metal-element-containing substance is taken as 100% by mol.

4. The production process for lithium-silicate-based compound as set forth in claim 3, to which iron and/or manganese oxide is included, and which further comprises at least one compound selected from the group consisting of cobalt oxide, magnesium oxide, calcium carbonate, aluminum oxide, nickel oxide, niobium oxide, lithium titanate, chromium (III) oxide, copper (II) acetate, zinc oxide, zirconium oxide, vanadium carbide, lithium molybdate, and lithium tungstate.

5. A production process for lithium-silicate-based compound as set forth in claim 1, further including a step of removing said alkali-metal nitrate by means of a solvent after producing a lithium-silicate-based compound.

* * * * *